United States Patent
Lavender et al.

(10) Patent No.: US 12,401,611 B1
(45) Date of Patent: Aug. 26, 2025

(54) EMAIL DELUGE SOLUTION

(71) Applicant: Bank of America Corporation, Charlotte, NC (US)

(72) Inventors: Laura Stillman Lavender, Washington, DC (US); Edward Lee Traywick, Bellbrook, OH (US); Christopher D. Nobile, Charlotte, NC (US); Nicholas O'Reilly, Dallas, TX (US); Joshua R. Johnson, Denver, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/586,810

(22) Filed: Feb. 26, 2024

(51) Int. Cl.
*G06F 15/16* (2006.01)
*H04L 51/212* (2022.01)
*H04L 51/222* (2022.01)

(52) U.S. Cl.
CPC .......... *H04L 51/212* (2022.05); *H04L 51/222* (2022.05)

(58) Field of Classification Search
None
See application file for complete search history.

(56) References Cited

U.S. PATENT DOCUMENTS

| 7,685,083 | B2 | 3/2010 | Fairweather |
| 8,193,931 | B2 | 6/2012 | Rapaport et al. |
| 8,230,070 | B2 | 7/2012 | Buyya et al. |
| 8,775,341 | B1 | 7/2014 | Commons |
| 8,930,827 | B1 | 1/2015 | Dumans |
| 9,460,299 | B2 | 10/2016 | Weiss et al. |
| 9,503,472 | B2 | 11/2016 | Laidlaw et al. |
| 9,911,134 | B2 | 3/2018 | Gupta et al. |
| 10,067,909 | B2 | 9/2018 | Kernert et al. |
| 10,778,628 | B2 | 9/2020 | Brechbuhl et al. |
| 10,878,379 | B2 | 12/2020 | Wing et al. |
| 11,165,741 | B2 | 11/2021 | O'Brien et al. |
| 11,240,181 | B1 | 2/2022 | Nagaraja et al. |
| 11,272,362 | B2 | 3/2022 | Dutt et al. |
| 11,689,563 | B1 * | 6/2023 | Spitler .................. H04L 51/212 726/22 |
| 11,775,891 | B2 | 10/2023 | Brown et al. |
| 11,841,912 | B2 | 12/2023 | Reznik |
| 12,273,382 | B2 * | 4/2025 | Ackerman .............. G06F 21/43 |
| 2011/0000044 | A1 | 1/2011 | Dorn et al. |
| 2017/0002938 | A1 | 10/2017 | McAllister et al. |
| 2019/0001562 | A1 | 5/2019 | Datta Ray |
| 2019/0002134 | A1 | 7/2019 | Adjaoute |
| 2021/0034741 | A1 * | 2/2021 | Beveridge ............... C03C 4/082 |

(Continued)

*Primary Examiner* — Phuoc H Nguyen
(74) *Attorney, Agent, or Firm* — Banner & Witcoff, Ltd.

(57) ABSTRACT

Arrangements for detecting an email deluge are provided. A computing platform may train an artificial intelligence (AI) engine. The computing platform may receive a group of electronic messages. The computing platform may identify a user profile based on an electronic user identifier associated with the group of electronic messages. The computing platform may determine one or more electronic characteristics based on content associated with the group of electronic messages. The computing platform may generate one or more rules to determine whether a deluge has been detected. Based on determine that a deluge has been detected, the computing platform may quarantine the group of electronic messages and/or perform other actions.

20 Claims, 9 Drawing Sheets

(56) References Cited

U.S. PATENT DOCUMENTS

2022/0030382 A1* 1/2022 Klasson ................ G16H 40/20
2023/0199002 A1* 6/2023 Kaidi .................. H04L 63/1425
726/22

* cited by examiner

Electronic Message Group $310_1$

Electronic Message Group $310_2$

300

Electronic Message Group $310_X$

400

500  510

Electronic Characteristics of Group Content

E-characteristic 1 – IP address

E-characteristic 2 – Geographic location

E-characteristic 3 – Communications protocol

E-characteristic 4 – Security protocol

E-characteristic 5 – Timestamp

Content Rules

Rule 1 – IP address

Rule 2 – Geographic Location

Rule 3 – communications protocol

Rule 4 – Security protocol

Rule 5 – Timestamp

Fig. 5B

Group Remediation Report

User Profile: ZZZ ZZZZ

Group Score: 8

Action Taken: Quarantine Email Deluge

FIG. 8A

Individual Remediation Report

User Profile: ZZZ ZZZZ

Individual Score of Message 1: 7

Action Taken: Quarantine 2/50 Messages

FIG. 8B

EMAIL DELUGE SOLUTION

BACKGROUND

Aspects of the disclosure relate to automatically detecting and protecting a network from an email deluge. An email deluge may refer to the reception of a large number of electronic messages (e.g., emails) by one or more devices through the network. A system, such as an enterprise system (e.g., a corporation, financial institution, educational institution, governmental institution, or the like) may provide a variety of critical services that may rely on a stable network connection and allocation of computing resources. The reception of a large number of electronic messages during a short period of time (e.g., an email deluge) may burden the network of the enterprise system (e.g., by reducing the bandwidth of the network), which may lead to poor performance and loss of critical services, which may further lead to loss of reputation. Further, in the case of one or more electronic messages carrying a payload such as, for example, malware, a virus and/or other fraudulent content, the one or more electronic messages may need to be quarantined in order to prevent the spread of the malware. Accordingly, it may be advantageous to identify more efficient and accurate methods and systems for automatically detecting an email deluge and protecting a network, while preserving network and computing resources.

SUMMARY

Aspects of the disclosure provide effective, efficient, scalable, and convenient solutions that address and overcome the technical problems associated with automatically detecting and protecting a network from an email deluge. In accordance with one or more aspects, a computing platform with at least one processor, a communication interface communicatively coupled to the at least one processor, and memory storing computer-readable instructions may train, based on a group of historical electronic messages, an artificial intelligence (AI) engine, wherein the AI engine may be trained to determine a user profile based on an electronic user identifier associated with the group of historical electronic messages, which may be based on matching the electronic user identifier with the user profile. The AI engine may further be trained to determine one or more historical electronic characteristics based on content associated with the group of historical electronic messages. The AI engine may further be trained to determine one or more profile parameters associated with the user profile, in which the one or more profile parameters correspond to characteristics of a user associated with the user profile. The AI engine may further be trained to determine one or more content parameters based on the one or more historical electronic characteristics, in which each of the one or more content parameters correspond to each characteristic of the one or more historical electronic characteristics. The AI engine may further be trained to generate one or more profile rules based on the one or more profile parameters and to generate one or more content rules based on the one or more content parameters, to determine whether a deluge has been detected. The computing platform may receive, from one or more electronic source devices, a first group of electronic messages. The computing platform may input the first group of electronic messages into the trained AI engine. The computing platform may determine, using the trained AI engine, a first user profile based on a first electronic user identifier associated with the first group of electronic messages. The computing platform may determine, using the trained AI engine, one or more electronic characteristics based on content associated with the first group of electronic messages. The computing platform may determine one or more profile parameters associated with the first user profile and determine one or more content parameters based on the one or more electronic characteristics. The computing platform may execute a first test to output a group score by applying the one or more profile rules and the one or more content rules to the one or more profile parameters associated with the first user profile and the one or more content parameters based on the one or more electronic characteristics. The computing platform may quarantine the first group of electronic messages based on the determining. The computing platform may generate a group remediation report, which may include the user profile, the group score, and an indication that the first group of electronic messages was quarantined. The computing platform may send, to a user device, the group remediation report and one or more commands directing the user device to display the group remediation report, which may cause the user device to display the group remediation report.

In some examples, the first group of electronic messages may be quarantined in a quarantine database that securely stores the first group of electronic messages. In some instances, the electronic user identifier may be an email address. In some examples, the one or more profile parameters associated with the user profile may include a role parameter, a length of role parameter, and a line of business parameter.

In some examples, the one or more electronic characteristics may include an internet protocol (IP) address, a geographic location, a communications protocol, a security protocol, and a timestamp. In one or more example, the computing system may, based on the group score exceeding a second threshold, lockdown an enterprise system associated with the computing platform and the user device.

In one or more examples, the computing platform may extract one or more electronic characteristics based on individual electronic message content associated with an electronic message of the first group of electronic messages. The computing platform may evaluate the one or more electronic characteristics based on the individual electronic message content. The computing platform may output an individual score based on the evaluating. The computing platform may determine that the individual electronic message is malicious based on the individual score exceeding a third threshold. The computing platform may quarantine the individual electronic message based on the determining. The computing platform may generate an individual remediation report, which may include the user profile, the individual score, and an indication that the individual electronic message was quarantined. The computing platform may send, to the enterprise user device, the individual remediation report and one or more commands directing the enterprise user device to display the individual remediation report, which may cause the enterprise user device to display the individual remediation report.

In some instances, the one or more electronic source devices may have unauthorized access to a private network associated with an enterprise system comprising the computing platform and the enterprise user device using a public network. In one or more examples, the one or more electronic source devices may be associated with an enterprise system comprising the computing platform and the enterprise user device, and may be comprised by one or more malicious actors that use the one or more electronic source devices to send the first deluge. In some cases, the computing platform may update the AI engine based on the first user profile, the executing the first test, the group score, and the quarantining.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A-5B depict electronic characteristics of group content and corresponding rules in accordance with one or more aspects described herein;

FIGS. 8A-8B show illustrative graphical user interfaces of a group remediation report and an individual remediation report in accordance with one or more aspects described herein.

DETAILED DESCRIPTION

Figure 1A:
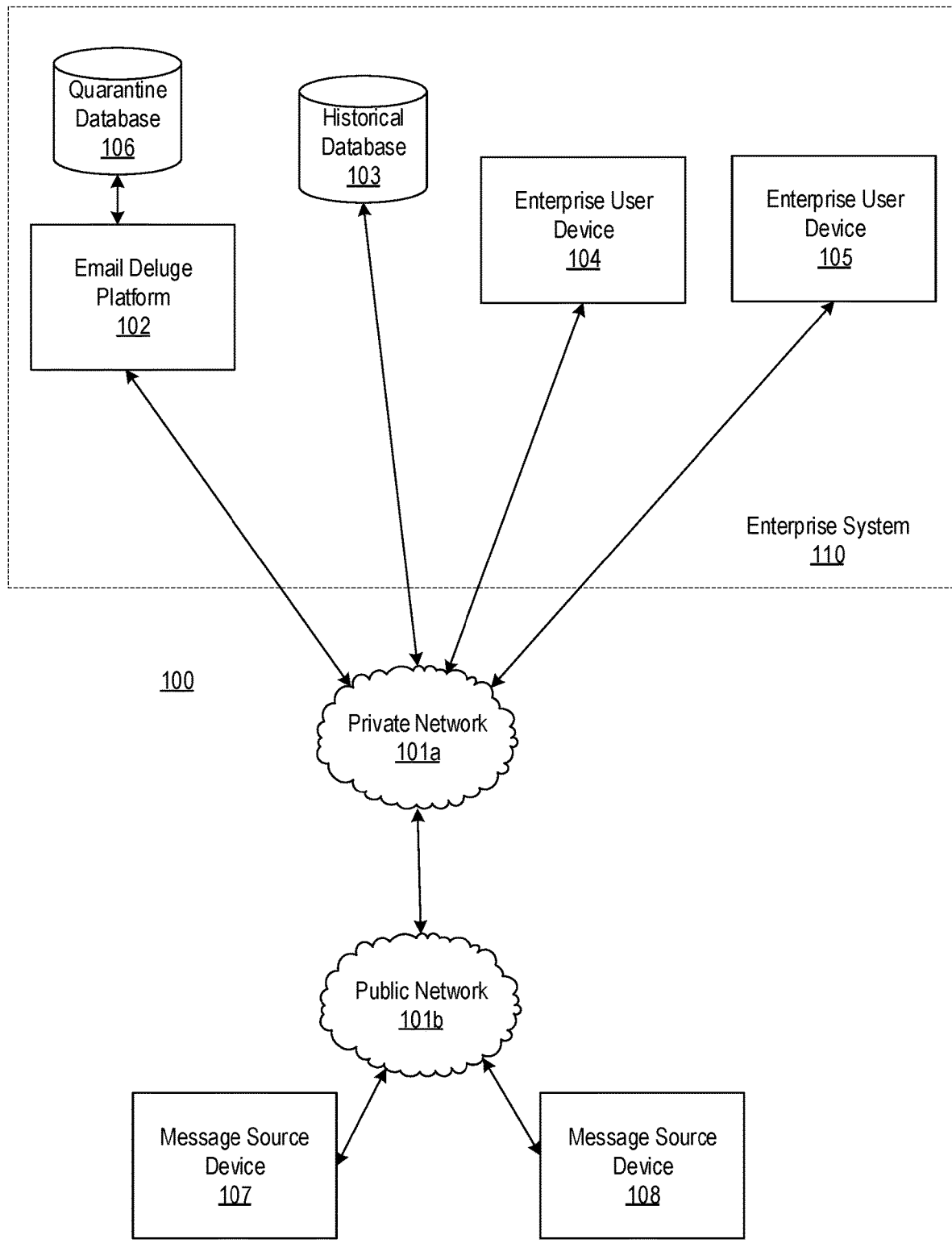
FIGS. 1A-1B depict an illustrative computing environment for implementing an email deluge solution in accordance with one or more example aspects described herein.

In the following description of various illustrative aspects, reference is made to the accompanying drawings, which form a part hereof, and in which is shown, by way of illustration, various aspects of the disclosure may be practiced. In some instances, other aspects may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction, one or more aspects of the disclosure relate to detecting an email deluge, protecting a network from the email deluge, and preserving the computing resources of an enterprise system and associated devices using the network. As discussed above, an enterprise system (e.g., a corporation, financial institution, educational institution, governmental institution, or the like) may rely on a stable network connection and allocation of computing resources to perform critical services. In some instances, the enterprise system may have a finite amount of network resources, computing resources, and/or network bandwidth to perform day-to-day functions and provide services.

When receiving a large number of electronic messages from unknown and/or known sources in a small period of time, representing, for example, malicious (e.g., a distributed denial-of-service (DDoS) attack) or non-malicious activity, the network may be overburdened, which may result in poor system performance and/or loss of reputation. For example, with respect to computing resources, an enterprise system may have a finite amount of memory in which to store electronic messages, data relating to services provided by the enterprise system, and/or other types of data. A large increase in stored data associated with the reception of large numbers of electronic messages over time may exponentially increase the storage costs associated with the enterprise system.

Additionally or alternatively, with respect to bandwidth, an enterprise system may rely on stable network traffic in order to function and perform its services. The reception of large numbers of electronic messages during a short period of time may reduce the bandwidth of the enterprise system, which may result in an overburdened network that may lead to a reduced ability of the enterprise system to provide business and/or other critical services.

In some instances, if one or more electronic messages carrying a payload such as, for example, malware, a virus and/or other fraudulent content is received and spread throughout the network of the enterprise system, then the enterprise system may have to pay large costs associated with fixing the network. For example, a group of electronic messages may include a fraudulent electronic message (e.g., a fraudulent purchase or electronic message with a malware payload) that may be hidden in the group of electronic messages. As such, it may be necessary to develop methods and systems to quarantine one or more electronic messages that makeup an email deluge in order to protect the network.

Accordingly, described herein is an email deluge platform that may train an artificial intelligence (AI) engine to detect the presence of an email deluge, and perform one or more remedial actions to protect a network from being negatively impacted by the email deluge. In some instances, the AI engine may be trained using historical groups of electronic messages in order to detect an email deluge. For example, the AI engine may be trained to extract an electronic user identifier associated with a particular group of electronic messages, identify a user profile associated with the electronic user identifier, determine profile parameters associated with the user profile, and generate profile rules based on the profile parameters, in order to detect an email deluge, as discussed in more detail below with respect to FIGS. 2, 3, 4A and 4B. In some instances, the AI engine may be trained to extract group content associated with a particular of electronic messages, extract group content and determine electronic characteristics of the group content, determine content parameters and generate content rules based on the content parameters, in order to detect an email deluge, as discussed in more detail with respect to FIGS. 2, 3, 5A and 5B. In some instances, the profile rules and content rules may be combined as part of detecting the email deluge.

Accordingly, a test may be executed based on the profile and/or content rules that were previously generated by the AI engine. For example, the testing may include whether a particular rule has been triggered, and after all the rules have been tested, a group score may be outputted. In some instances, the group score may be compared to a threshold to determine whether an email deluge has been detected, as discussed in more detail with respect to FIG. 6. Additionally or alternatively, based on detecting an email deluge, actions may be performed to protect the network and preserve computing resources associated with the network. For example, an action may be to quarantine the group of electronic messages.

Accordingly, by reviewing electronic messages based on group characteristics, computing resources may be preserved by not having to review content of the individual electronic messages themselves (although review and analysis of individual electronic messages may still be performed as needed, in order to protect the network from malicious and/or fraudulent messages). Because an email deluge may already burden the network of the enterprise system, saving computing resources by performing the functions described herein may solve technical issues associated the reception of a large number of electronic messages in a short period of time. These and other features are described in further detail below.

Figure 1B:
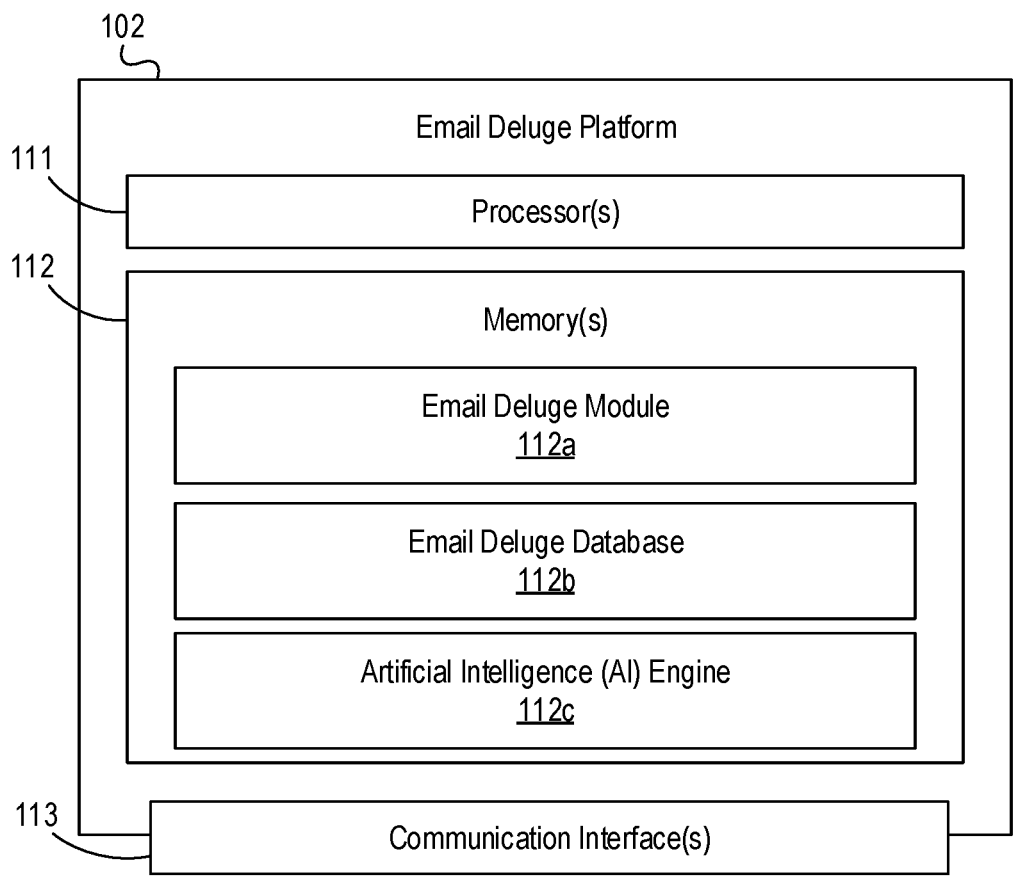

FIGS. 1A-1B depict an illustrative computing environment for implementing an email deluge solution. Referring to FIG. 1A, computing environment 100 may include one or more computer systems connected through one or more networks. For example, computing environment 100 may include email deluge platform 102, historical database 103, enterprise user devices 104 and 105, quarantine database 106, and message source devices 107 and 108. While the illustration of FIG. 1A includes particular numbers of devices, any number of systems or devices may be used without departing from the aspects described herein.

As mentioned above, computing environment 100 also may include one or more networks, which may interconnect one or more of email deluge platform 102, historical database 103, enterprise user devices 104 and 105, quarantine database 106, and/or message source devices 107 and 108. For example, computing environment 100 may include private network 101a and public network 101b. In some instances, private network 101a and/or public network 101b may include one or more sub-networks (e.g., Local Area Networks (LANs), Wide Area Networks (WANs), or the like). In some instances, private network 101a may be associated with a particular user, location (e.g., home, office), and/or organization (e.g., a corporation, financial institution, educational institution, governmental institution, or the like) and may interconnect one or more computing devices associated with the user, location and/or organization.

According to one or more aspects, one or more devices within the private network 101a may form a sub-network (e.g., enterprise system 110). In FIG. 1A, for example, email deluge platform 102, historical database 103, enterprise user devices 104 and 105, and/or quarantine database 106 may collectively form a sub-network of devices. For example, enterprise system 110 may be a sub-network that represents an organization (e.g., a corporation, financial institution, educational institution, governmental institution, or the like). Devices in enterprise system 110 may communicate with one another using private network 101a and/or public network 101b.

As described further below, email deluge platform 102 may be a computer system that includes one or more computing devices (e.g., servers, server blades, or the like) and/or other computer components (e.g., processors, memories, communication interfaces) that may be used to train, host, and/or otherwise refine an artificial intelligence (AI) engine, which may be used to automatically detect the presence of an email deluge and take corrective action (e.g., quarantine a group of electronic messages, quarantine individual electronic messages, and/or the like) to protect the network associated with enterprise system 110.

Historical database 103 may include one or more computing devices and/or other computer components (e.g., processors, memories, communication interfaces). In some instances, historical database 103 may include one or more data sources that may store historical groups of electronic messages, which may be used by email deluge platform 102 in furtherance of training the AI engine. In some instances, historical database 103 may be configured as a cloud storage system, in which historical database 103 may be a cloud computing model that stores information on the Internet through a cloud computing provider who manages and operates historical database 103 as a service. In some instances, historical database 103 may be local or non-cloud based storage, or may support cloud based storage.

Enterprise user devices 104 and 105 may be a laptop computer, desktop computer, mobile device, tablet, smartphone, and/or other device, which may represent, for example, a user within enterprise system 110. In some instances, enterprise user device 104 may be a user computing device that is used by an individual. In some instances, enterprise user device 104 may be a computing device that is used by an administrator. In some instances, enterprise user device 104 may be configured to display one or more user interfaces (e.g., interfaces depicting a group remediation report, an individual remediation report, or the like). In some instances, a user associated with enterprise user device 104 may have a role within enterprise system 110 (e.g., a financial role, engineering role, administrative role, and/or other roles). In some instances, the user's role may be part of a user profile, which may be used to train the AI engine to generate profile-based rules to determine whether a group of electronic messages is an email deluge, as discussed in more detail with respect to FIGS. 2, 4A and 4B.

Quarantine database 106 may include one or more computing devices and/or other computer components (e.g., processors, memories, communication interfaces). In some instances, quarantine database 106 may include one or more data sources that may store a group of electronic messages that has been determined by email deluge platform 102 to be an email deluge. In some instances, quarantine database 106 may be configured as a cloud storage system, in which quarantine database 106 may be a cloud computing model that stores information on the Internet through a cloud computing provider who manages and operates quarantine database 106 as a service. In some instances, historical database 106 may be local or non-cloud based storage, or may support cloud based storage. In some instances, quarantine database 106 may be used by email deluge platform 102 to quarantine a group of electronic messages that has been identified as a deluge, in order to protect an enterprise system (e.g., enterprise system 110) from potential malware within one or more electronic messages within the group of electronic messages. In doing so, quarantine database 106 may provide technical benefits associated with protecting a network from malware, viruses, and/or other fraudulent content (e.g., saving large costs associated with fixing a network infected with malware). In some cases, quarantine database 106 may be exclusively connected to email deluge platform 102 in order to provide for more protection of the network and devices using the network. Additionally or alternatively, quarantine database may include have more security features than other databases, such as historical database 103.

Message source devices 107 and 108 may be devices associated with an individual or entity that is currently operating outside of private network 101a. In some instances, message source devices 107 and 108 may, together or individually, be a source of an email deluge, and may connect to the private network 101a of enterprise system 110 through the public network 101b. In some instances, message source devices 107 and 108 may be devices associated with enterprise system 110, which may have been taken advantage of by a malicious actor in order to gain access to enterprise system 110 in furtherance of sending an email deluge.

In one or more arrangements, email deluge platform 102, historical database 103, enterprise user devices 104 and 105, quarantine database 106, and message source devices 107 and 108 may be any type of computing device capable of sending and/or receiving requests and processing the requests accordingly. For example, email deluge platform 102, historical database 103, enterprise user devices 104 and 105, quarantine database 106, and message source devices 107 and 108, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of email deluge platform 102, historical database 103, enterprise user devices 104 and 105, quarantine database 106, and message source devices 107 and 108 may, in some instances, be special-purpose computing devices configured to perform specific functions.

Referring to FIG. 1B, automated error analysis and correction platform 102 may include one or more processors 111, memory 112, and communication interface 113. A data bus may interconnect processor 111, memory 112, and communication interface 113. Communication interface 113 may be a network interface configured to support communication between email deluge platform 102 and one or more networks (e.g., private network 101a, public network 101b, or the like). Memory 112 may include one or more program modules having instructions that when executed by processor 111 cause email deluge platform 102 to perform one or more functions described herein and/or one or more databases that may store and/or otherwise maintain information which may be used by such program modules and/or processor 111. In some instances, the one or more program modules and/or databases may be stored by and/or maintained in different memory units of email deluge platform 102 and/or by different computing devices that may form and/or otherwise make up email deluge platform 102. For example, memory 112 may have, host, store, and/or include email deluge module 112a, email deluge database 112b, and/or artificial intelligence (AI) engine 112c.

Email deluge module 112a may have instructions that direct and/or cause email deluge platform 102 to detect the presence of an email deluge, evaluate individual electronic messages for malicious and/or fraudulent content, and/or perform other functions, as discussed in greater detail below. Email deluge database 112b may store information used by email deluge module 112a and/or email deluge platform 102 in application of advanced techniques to detect an email deluge, and/or in performing other functions. AI engine 112c may be used by email deluge platform 102 and/or email deluge module 112a to train, refine and/or otherwise update methods for detecting an email deluge, evaluating individual electronic messages for malicious and/or fraudulent content, and/or other performing methods described herein.

Figure 2:
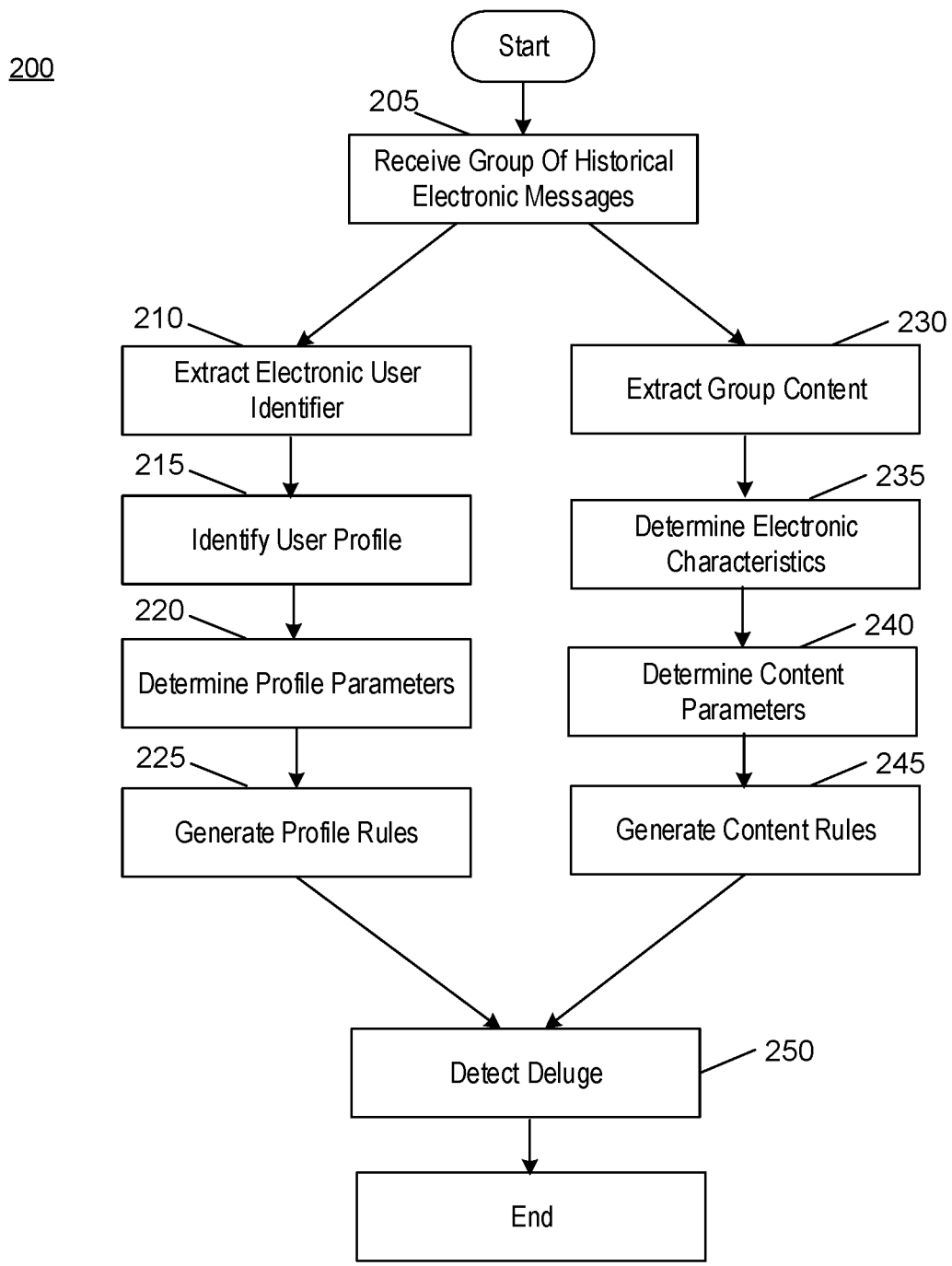
FIG. 2 depicts a flow chart illustrating an example method for training an artificial intelligence (AI) engine to detect an email deluge in accordance with one or more aspects described herein.

FIG. 2 is a flow chart illustrating an example method for training an artificial intelligence (AI) engine to detect an email deluge. Email deluge platform 102 (FIG. 1) may train an AI engine (e.g., AI engine 112c) based on one or more groups of historical electronic messages that correspond to previously identified one or more email deluges. The one or more groups of historical electronic messages may be inputted into the AI engine to generate one or more rules (e.g., profile rules and/or content rules) that may subsequently be used to detect that a future group of electronic messages is an email deluge (as discussed in FIG. 6). Steps 205-250 explain example processes of how email deluge platform 102 may train the AI engine using the one or more groups of historical electronic messages. For example, steps 210-225 show how email deluge platform 102 may train the AI engine to generate one or more profile rules, and steps 230-245 show how email deluge platform 102 may further train the AI engine to generate one or more content rules, as discussed in more detail below. Although shown sequentially for clarity, steps 210-225 and steps 230-245 may be performed in parallel without departing from the scope of the disclosure. Additionally, while steps 210-225 and steps 230-245 are shown as parallel processes, they may be performed sequentially as well.

In some instances, the AI engine may utilize supervised learning, in which labeled datasets may be inputted into to the AI engine (e.g., one or more groups of historical electronic messages that correspond to one or more previously identified email deluges), which may be used to train the AI engine to perform the functions described below. For example, supervised learning techniques such as linear regression, classification, neural networking, and/or other supervised learning techniques may be used.

Figure 3:
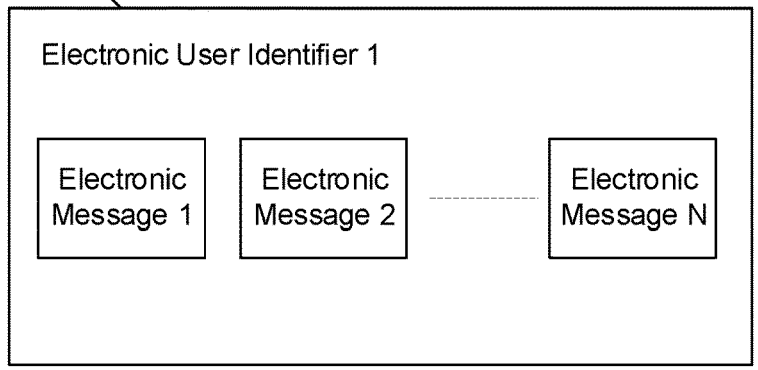
FIG. 3 depicts an example of electronic message groups in accordance with one or more aspects described herein.
Figure 3:
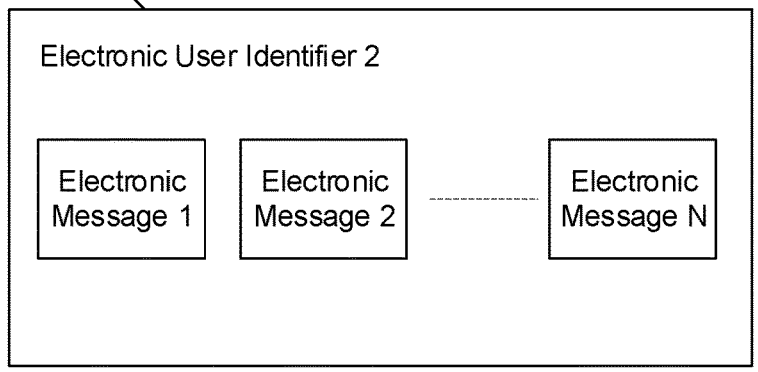
Figure 3:
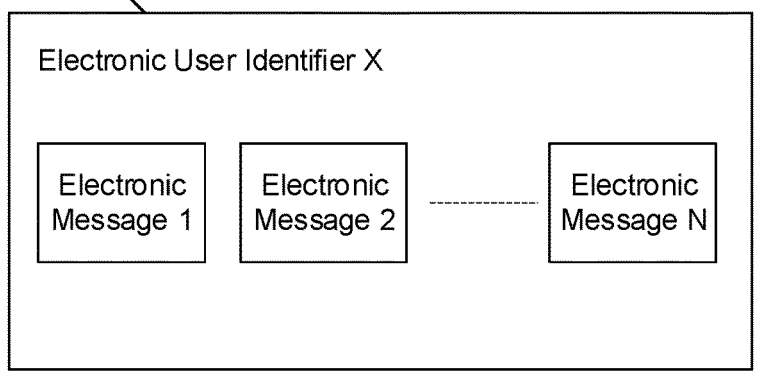

In step 205, the AI engine may receive one or more groups of historical electronic messages. For example, the one or more groups of historical electronic messages may initially be stored at historical database 103, and email deluge platform 102 may request that historical database 103 send the one or more groups of historical electronic messages using private network 101a and via communication interface 113. Then, as part of step 205, email deluge platform 102 may input the one or more groups of historical electronic messages into the AI engine, so that the AI engine may receive them. In some instances, the one or more groups of historical electronic messages may look like electronic message groups $310_1$-$310_x$ (as shown in FIG. 3) and contain an electronic user identifier, one or more electronic messages, and/or other information that may be used to train the AI engine to perform the functions described herein.

Referring now to a process for generating one or more profile-based rules, at step 210, the AI engine may extract an electronic user identifier associated with a particular group of historical electronic messages received in step 205. For example, the AI engine may extract a corresponding electronic user identifier that is used to categorize one or more historical electronic messages as a group (e.g., electronic user identifier 1 for electronic messages group $310_1$). In order to accomplish the extraction, the AI engine may utilize supervised learning and use, for example, a classification model, a subtype of supervised learning, in which certain types of data may be classified as corresponding to a particular category of information (e.g., an electronic user identifier). In doing so, the AI engine may, based on receiving a group of historical electronic messages, identify the shared electronic user identifier among a group of historical electronic messages, and extract the corresponding electronic user identifier. Additionally or alternatively, the user identifier may be specified using a data tag such that the AI engine may identify the tag and extract the value associated with that tag. In one or more examples, the electronic user identifier may be an email address or other type of electronic identifier that may be used to determine a user profile associated with the electronic user identifier, as discussed in step 215.

At step 215, the AI engine may identify a user profile based on the electronic user identifier. For example, after extracting the electronic user identifier in step 210, the AI engine may query a database (e.g., email deluge database 112b and/or other databases) using the electronic user identifier as a keyword, to match the electronic user identifier with a user profile among one or more user profiles stored in the database. In some instances, if a match is not found, the AI engine may notify an administrator associated with the enterprise system, who may take further action (e.g., create a new user profile). In some examples, a user profile may represent an individual who is associated with the enterprise system, such as an employee of a company. In some instances, there may be a plurality of user profiles associated with corresponding electronic user identifiers, which may represent the employees that makeup the company.

At step 220, the AI engine may determine one or more profile parameters associated with the user profile that was identified in step 215. In some cases, the profile parameters may correspond to characteristics of an individual/user associated with the user profile (e.g., an employee of a company). For example, the profile parameters may include a role parameter (corresponding to, e.g., the role of the individual associated with the user profile), a length of role parameter (corresponding to, e.g., the length of time the individual has had the corresponding role), a line of business parameter (corresponding to, e.g., the line of business of the company), and/or the like. In some instances, the user profile may include a file that may contain the profile parameters. In some instances, the user profile may contain information (i.e., an address) that indicates a location in a database (e.g., email deluge database 112b and/or other databases), in which the profile parameters may be located.

In some instances, there may be different categories of profile parameters located in different files. For example, profile parameters that are common to all user profiles (e.g., a line of business parameter), may be located in a single file, which may avoid storing duplicate information. Additionally or alternatively, profile parameters that are unique to a specific user profile (e.g., the particular role associated with the user profile) may be stored in a single file with the user profile. In some instances, if the profile parameters are stored in a wrapped file (e.g., a zip file), upon locating the file, the AI engine may execute a command (e.g., an extract-all( ) command), which may cause the contents of the file (e.g., the profile parameters), to be extracted from the file and read into local storage associated with the AI engine.

At step 225, the AI engine may generate one or more profile rules based on the profile parameters that were determined in step 220, which may subsequently be used to detect whether a future group of electronic messages is an email deluge, as discussed in more detail with respect to FIG. 6. The rules may be based on the profile parameters, which may be used in furtherance of determining whether or not a group of electronic messages is an email deluge (shown in illustrative displays 410 and 420 in FIG. 4). For example, the AI engine may utilize a linear regression model, a subtype of supervised learning, in order to create rules by identifying patterns based on the profile parameters, to predict the likelihood that triggering the rules would give rise to an inference that the group of electronic messages is an email deluge. Further, the AI engine may iterate through every profile parameter, find links between the parameters and the group of historical electronic messages that was previously identified as an email deluge, and create rules based on those links that may then be applied to a future group of electronic messages.

For example, if a user's role is that of an engineer, then a corresponding rule may be, based on having a role of an engineer, if the user receives one or more electronic messages relating to financial transactions for the company, then the rule may be triggered, which may be indicative that the electronic messages are part of a deluge. In another example, if a user's length of role is less than 30 days, then a corresponding rule may be, based on having that role for a shorter period of time, the total number of electronic messages received during a period of time may be, for example, 20% more than for being at a role longer than 30 days, which may represent an expectation that a user in a newer role may receive more electronic messages than a user who has been in that role for a longer period of time.

Referring now to a process for generating content-based rules, at step 230, the AI engine may extract group content associated with the group of historical electronic messages. Group content may refer to information that is common among a group of electronic messages, which may be further categorized into one or more electronic characteristics, as discussed in more detail at step 235. After receiving the group of historical electronic messages in step 205, the AI engine may extract the group content by taking the group of historical electronic messages and reading the group content of each of the historical electronic messages in the group into local storage associated with the AI engine (e.g., using a localStorage( ) command). In some instances, the extracting in step 230 may occur in parallel with the extracting in step 210.

At step 235, the AI engine may determine electronic characteristics based on the group content of the historical electronic messages. After extracting the group content in step 230, the information may further be categorized into one or more common electronic characteristics. An electronic characteristic may be, for example, an internet protocol (IP) address, a geographic location, a communications protocol (e.g., post office protocol (POP), internet message access protocol (IMAP), simple mail transfer protocol (SMTP), and/or other protocols, a security protocol (e.g., secure sockets layer (SSL), transport layer security (TLS), and/or other protocols), a timestamp, and/or other characteristics that are common to each electronic message of the historical electronic message group.

For example, the AI engine may utilize a classification model, in which certain types of data may be classified as corresponding to a particular category of information (e.g., an IP address). In doing so, the AI engine may categorize different types of data and, for each historical electronic message of the group of historical electronic messages, the AI engine may be able to detect that a particular type of data (i.e., the IP address), as belonging to that category of information (i.e., the corresponding IP address electronic characteristic). In some instances, each electronic message of the group of electronic messages may have a corresponding electronic characteristic (such as what is shown by illustrative display 510 in FIG. 5).

At step 240, the AI engine may determine one or more content parameters based on the electronic characteristics that were determined in step 235. In some instances, each content parameter may be an N-dimensional vector that includes an electronic characteristic for each historical electronic message. For example, for an electronic message group with N-number of electronic messages (e.g., electronic message 1 through electronic message N of electronic message group $310_1$), an IP address parameter may be an N-dimensional vector, in which each IP address of each of the electronic messages may be included in the IP address parameter.

At step 245, email deluge platform 102 may generate one or more content rules based on the content parameters that were determined in step 240, which may subsequently be used to whether a future group of electronic messages is an email deluge, as discussed in more detail with respect to FIG. 6. For example, the AI engine may utilize a linear regression model, a subtype of supervised learning, in order to create rules by identifying patterns based on the rule parameters, to predict the likelihood that triggering the rules would give rise to an indication that the group of electronic messages is an email deluge. Further, the AI engine may iterate through every content parameter, find links between the parameters and the group of historical messages that was previously identified as an email deluge, and create rules based on those links that may then be applied to a future group of electronic messages.

An example of a rule may be, if every electronic message of the group of electronic messages is from the same IP address, then the rule may be triggered, which may be indicative that the electronic messages are part of a deluge. As another example, if the security protocol of one or more of the electronic messages is an older or less used protocol, such as TLS 1.0 (as opposed to a more current version, e.g., TLS 1.3), which may have exploitable security vulnerabilities, then the rule may be triggered.

Figure 6:
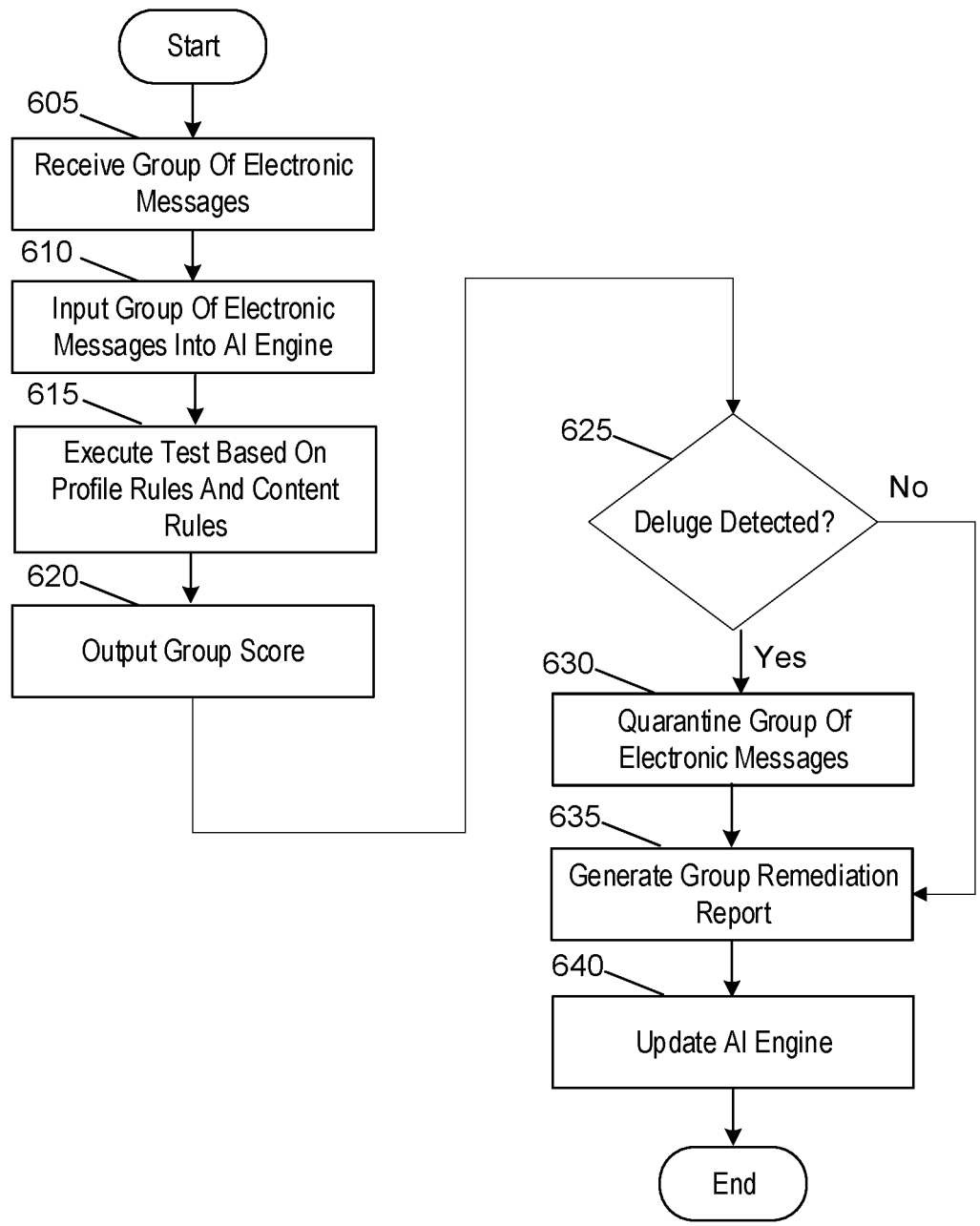
FIG. 6 is a flowchart illustrating an example method of detecting an email deluge using the AI engine in accordance with one or more aspects described herein.

At step 250, the AI engine may use the one or more profile rules and/or one or more content rules to detect whether a future group of electronic messages is a deluge, as discussed in more detail with respect to FIG. 6.

Figure 4A:
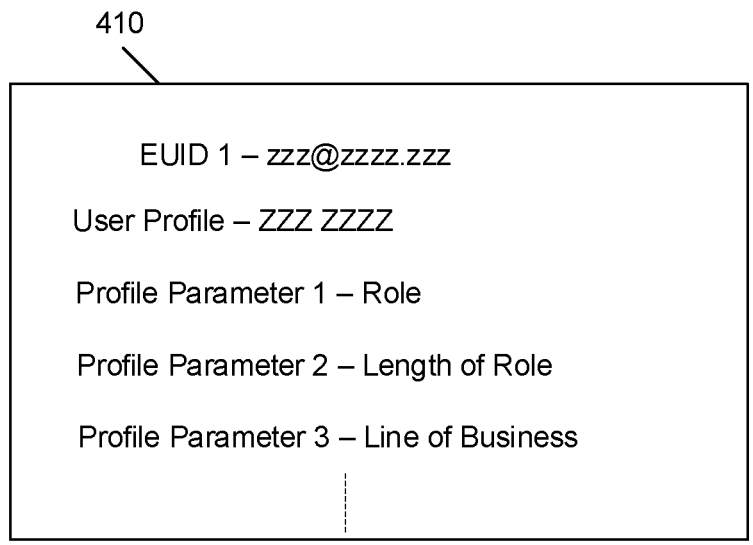
FIGS. 4A-4B depict an example user profile and corresponding parameters and rules in accordance with one or more aspects described herein.

FIG. 3 depicts an example of electronic message groups. For example, FIG. 3 illustrates electronic message groups $310_1$-$310_x$. Each of the electronic message groups $310_1$-$310_x$ may be used with respect to the training steps discussed in FIG. 2. In some instances, each group may include one or more electronic messages that may be categorized as all belonging to the same electronic user identifier. For example, electronic message group $310_1$ may include an electronic user identifier such as, for example, ZZZ@ZZZZ.ZZ (as shown in FIG. 4A), which may be associated with the user profile of ZZZ ZZZZ. Electronic message group $310_1$ may further include, for example, 10000 electronic messages, which email deluge platform 102 may input into the AI engine to perform the actions described with respect to FIG. 2. In some instances, there may be more than one historical electronic message group associated with a particular electronic user identifier, which may be used to further refine the AI engine. In some instances, there may be a plurality of electronic message groups corresponding to a plurality of electronic user identifiers. As another example, one or more of electronic message groups $310_1$-$310_x$ may represent a future electronic message group that is inputted into the AI engine to determine whether the electronic message group is an email deluge, as discussed in more detail with respect to FIG. 6.

It may be advantageous to group electronic messages in the manner previously described because electronic messages are generally sent to a particular destination address, and as such, grouping electronic messages based on the particular user receiving the electronic messages may be an efficient way to categorize the electronic messages and further to train the AI engine. Although categorized in the way previously described, different categorization methods may be used without departing from the scope of the disclosure.

Figure 4B:
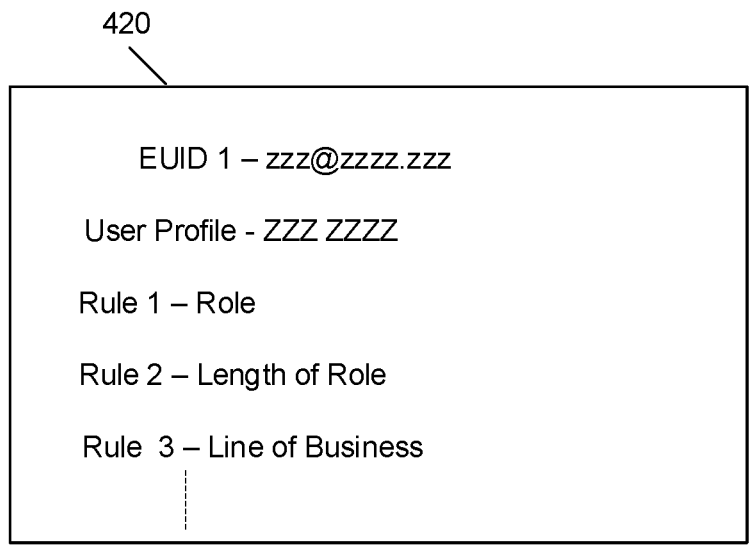

FIGS. 4A-4B depict an example user profile and corresponding parameters and rules. For example, illustrative display 410 of FIG. 4A may show a particular user profile associated with an electronic user identifier. Illustrative display 410 may further show one or more profile parameters associated with the user profile. For example, illustrative display 420 of FIG. 4B may show one or more rules based on the one or more corresponding profile parameters that may be used by email deluge platform 102 in training the AI engine to detect that a group of electronic messages is an email deluge.

For example, profile parameter 1 may include a role parameter, corresponding to the role of an employee at a company. Rule 1 may be based on the role parameter, and may evaluate the type of role the employee has and determine the likelihood that a group of electronic messages is an email deluge based on that type of role. For example, an engineer would not be expected to receive electronic messages relating to financial transactions, and an accountant would not be expected to receive electronic messages relating to requests for engineering design documents. In some instances, determining whether an electronic message contains certain information (e.g., information about financial transactions, engineering design documents, etc) may be performed using a predefined keyword search, or the like.

As another example, profile parameter 2 may include a length of role parameter, corresponding to a length of time an employee has been in the particular role. Rule 2 may be based on the length of role parameter, and may evaluate the length of time the employee has had the particular role and determine the likelihood that a group of electronic messages is an email deluge based on how long the employee has had that role. For example, if the employee has been in a particular role for less than 30 days, there may be an expectation that the employee would receive more electronic messages related to onboarding, training, or the like.

As another example, profile parameter 3 may include a line of business role, corresponding to the type of business a company may be involved in. This parameter may be used across all employees throughout a company. Rule 3 may be based on the line of business parameter, and may evaluate the type of business the company is involved in and determine the likelihood that a group of electronic messages is an email deluge based on the line of business of the company. If the company is a local cheese shop that sources ingredients from a local dairy farm, then if any employee receives electronic messages about financing requests for construction development, those messages may be indicative of an email deluge.

FIGS. 5A-5B depict electronic characteristics of group content and corresponding rules. For example, illustrative display 510 of FIG. 5B may show one or more electronic characteristics of group content associated with the group of electronic messages. In some instances, an electronic characteristic may be an IP address, a geographic location, a communications protocol, a security protocol, a timestamp protocol, and/or other protocols/characteristics. For example, illustrative display 520 of FIG. 5B may show one or more rules based on the one or more electronic characteristics and the one or more content parameters (not shown), as discussed in more detail with respect to FIG. 2.

For example, electronic characteristic 1 may include an IP address. Rule 1 may be based on the IP addresses of the group of electronic messages, and may evaluate the IP address of each of the electronic messages. Shared IP addresses among electronic messages in a group may be indicative that the electronic messages are being sent from the same source, which may be indicative of an email deluge. As another example, electronic characteristic 2 may include a geographic location. Rule 2 may be based on evaluating the geographic location of the source origin of each of the electronic messages. If the sources of the electronic messages are clustered in a geographic region that is known to be a source of email deluges, that may be indicative of an email deluge.

As another example, electronic characteristic 3 may include a communications protocol used by one or more of the electronic messages (e.g., post office protocol (POP), internet message access protocol (IMAP), simple mail transfer protocol (SMTP), border gateway protocol (BGP) and/or other protocols). Rule 3 may be based on evaluating the communications protocols used by the electronic messages for the types of protocols used, which may be indicative of an email deluge. If one or more of the electronic messages uses a BGP, a protocol known to be exploited by DDOS attacks via BGP hacking, then that may increase the likelihood that an email deluge has occurred.

As another example, electronic characteristic 4 may be a security protocol (e.g., secure sockets layer (SSL), transport layer security (TLS), and/or other protocols). Rule 4 may be based on evaluating the security protocols used by the electronic messages, which may be indicative of an email deluge. If the security protocol of one or more of the electronic messages is an older or less used protocol, such as TLS 1.0 (as opposed to a more current version, e.g., TLS 1.3), which may have exploitable security vulnerabilities, then that may increase the likelihood of the occurrence of an email deluge.

As another example, electronic characteristic 5 may be a timestamp, which may represent the time one or more of the electronic messages are received. Rule 5 may be based on evaluating the electronic messages to determine the time at which the messages were received, which may be indicative of an email deluge if, for example, a large number of electronic messages is received during a time of day typically not associated with large electronic message traffic (i.e., the middle of the night), which may represent a DDOS attack. In some instances, the profile rules and/or the content rules may be combined to further determine whether a group of electronic messages is an email deluge. For example, if the electronic messages share an IP address and the electronic messages are received during a time of day that is typically not associated with receiving large numbers of electronic messages, then that may be a strong indicator of an email deluge. As another example, if the geographic location of the electronic messages is clustered in a region know to be a source of email deluges, but the company trades goods with that particular region, then there be less of a likelihood that the electronic messages are an email deluge. As another example, if the role of the employee is that of a customer service associate that answers customer service calls from all around the world, then the time of day electronic messages are received may be less relevant and the geographic regions of the received electronic messages may also be less relevant in detecting an email deluge.

FIG. 6 is a flowchart illustrating an example method of detecting an email deluge using an AI engine. The method of FIG. 6 illustrates how email deluge platform 102 may use the trained AI engine to determine whether a group of electronic messages is an email deluge using the previously generated profile and/or content rules, and, based on determining the group of electronic messages is an email deluge, taking corrective action.

At step 605, email deluge platform 102 may receive a group of electronic messages. For example, email deluge platform 102 may, based on receiving a large number of electronic messages during a short period of time (e.g., more than 100000 electronic messages in 1 minute), automatically input the group of electronic messages into the AI engine. In some instances, email deluge platform 102 may periodically input a group or groups of electronic messages into the AI engine during a configurable period of time. In some instance, email deluge platform 102 may, based on detecting a malicious electronic message (as discussed in FIG. 7), automatically input all the electronic messages that share the same electronic user identifier into the AI engine. In some instances, the group of electronic messages may be similar to one of the groups of electronic messages shown in FIG. 3.

At step 610, email deluge platform 102 may input the group of electronic messages into the AI engine. Upon inputting the group of electronic messages into the AI engine, the AI engine may automatically perform actions similar to steps of 210-220 and/or steps 230-240 of FIG. 2, in preparation of applying the previously generated profile rules and/or content rules to the group of electronic messages. For example, similar to steps 210-220, the AI engine may extract an electronic user identifier associated with the group of electronic messages, identify a user profile by matching the electronic user identifier to the user profile, and determine one or more profile parameters associated with the user profile, in preparation of applying the previously generated profile rules to the profile parameters of the group of electronic messages, as part of the testing performed in step 615.

Additionally or alternatively, similar to steps 230-240, the AI engine may extract group content of the group of electronic messages, determine the electronic characteristics of the electronic messages, and determine the profile parameters based on the electronic characteristics of the electronic messages, in preparation of applying the previously generated content rules to the content parameters of the group of electronic messages, as part of the testing performed in step 615.

At step 615, email deluge platform 102 may execute a test by applying the previously generated rules in FIG. 2 to the profile parameters and/or the content parameters of the group of electronic messages. For example, if a particular rule is triggered, then email deluge platform 102 may assign a point or points based on that rule being triggered, which may be used as part of outputting a group score in step 620. In some instances, triggering a particular rule may output a numerical value, with a higher numerical value corresponding to a higher likelihood that the group of electronic messages is an email deluge. For example, a content rule based on evaluating the IP address of each of the electronic messages may output a higher numerical value if all the IP addresses of the electronic messages are the same, indicating, for example, a high likelihood that the group of electronic messages is an email deluge.

As another example, based on a rule that evaluates the security protocol of each electronic message of the group of electronic messages, if every electronic message uses an up-to-date secured protocol, such as, for example, a TLS 1.3 protocol, which may suggest a lower likelihood that the group of electronic messages is an email deluge, then a lower numerical value or zero value may be outputted. As another example, based on a rule that evaluates the geographic region of each of the electronic messages may output a higher numerical value if all the geographic locations of the electronic messages are clustered in a location which is known to be a source of email deluges.

At step 620, email deluge platform 102 may output a group score. In some instances, the group score may represent the number of rules that were triggered in step 615. For example, the numerical values that were outputted based on evaluating the parameter rules and/or content rules may be aggregated into the group score, with a higher numerical value corresponding to a higher likelihood of an email deluge (e.g., 9), and a lower numerical value corresponding to a lower likelihood of an email deluge (e.g., 2).

In some instances, outputs to certain rules may be weighted based on how important the rule is in determining whether a group of electronic messages is an email deluge. For example, the IP address of the electronic messages may be more indicative of an email deluge because the more electronic messages that come from the same IP address, the higher likelihood that the electronic messages are coming from the same electronic source, which may be a strong indicator of an email deluge. As such, an IP address rule may be weighted more heavily (e.g., 1.5× weight) and output a higher numerical value.

As another example, geographic location may be an attribute that is more indicative of an email deluge if the line of business parameter is a local cheese shop that sources ingredients from a local dairy farm, because, if the geographic locations of the electronic messages are clustered in a different continent from the dairy farm, then that may be more indicative of an email deluge and thus a corresponding rule may be weighted more heavily (e.g., 1.25× weight). However, if the line of business is in international trade, then electronic messages from geographic locations in different continents may merely be related to international trade and thus less indicative of an email deluge, which means a corresponding rule may be weighted to reduce the outputted numerical value (e.g., 0.5× weight).

For example, a group score of 8 may represent a numerical output of 8 based on the testing performed in step 615, which may correspond to 8 rules that were triggered during the testing. At step 625, email deluge platform 102 may detect whether an email deluge has occurred based on the testing of step 615 and the group score that was outputted in step 620. If a deluge is detected, the method may proceed to step 630. If a deluge is not detected, the method may proceed to step 635.

In some instances, an email deluge may be detected based on a group score meeting or exceeding a threshold. For example, the threshold may be 8, which represents, e.g., a numerical output of 8 based on the testing, which may correspond to 8 rules that were triggered during the testing. In some instances, the threshold may be arbitrarily determined and chosen based on the number of rules that may be sufficient to determine that a group of electronic messages is an email deluge.

At step 630, email deluge platform 102 may quarantine the group of electronic messages based on a group score that meets or exceeds the threshold. For example, the electronic messages may be securely stored in quarantine database 106, which may not be accessed by devices or systems other than email deluge platform 102. In some cases, the quarantined group of electronic messages may be permanently removed after a period of time. Additionally or alternatively, the quarantined group may be further analyzed on an individualized basis. In some instances, if the threshold is not met or exceeded, the group of electronic messages may be individually review and analyzed before being quarantined, as discussed in more detail with respect to FIG. 7.

Although not shown, different actions may be taken based on group scores that meet or exceed other thresholds. For example, an additional threshold may be used for a different corresponding action, such as, for example locking down the enterprise system 110, alerting an administrator associated with the enterprise system 110 of the email deluge, blocking the source of the email deluge (e.g., message source device 107), and/or performing other actions.

At step 635, email deluge platform 102 may generate a group remediation report. For example, the group remediation report may look like the group remediation report shown in FIG. 8A. In some cases, the group remediation report may be sent to an enterprise user device (e.g., enterprise user device 107), whose user profile and/or electronic user identifier may correspond to the group of electronic messages.

At step 640, email deluge platform 102 may update the AI engine. In some instances, the updating may be based on the actions performed in any of steps 615-635. In doing so, email deluge platform 102 may dynamically and continuously update and/or otherwise refine the AI engine so as to increase accuracy of the AI engine over time.

Figure 7:
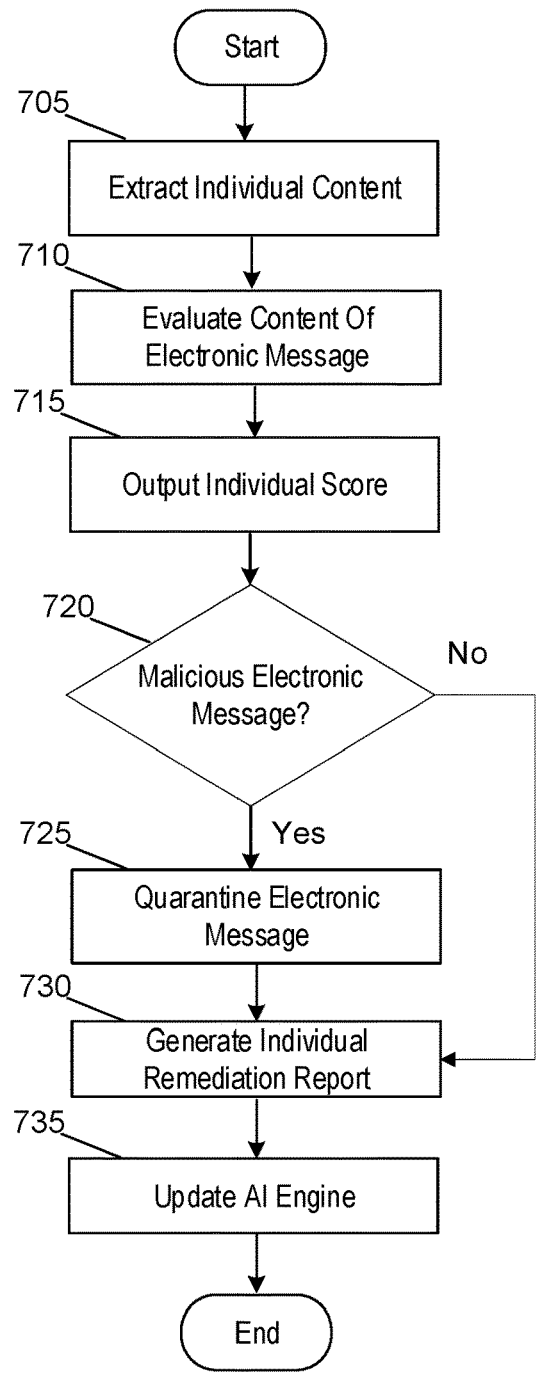
FIG. 7 is a flowchart illustrating an example method of identifying malicious electronic messages in accordance with one or more aspects described herein.

FIG. 7 is a flowchart illustrating an example method of identifying malicious electronic messages. It is noted that the details discussed with respect to FIG. 7 may be optional and may be performed as an additional analysis if necessary. In some cases, email deluge platform 102 may similarly train the AI engine to perform the functions described herein. For example, email deluge platform 102 may train the AI engine to generate one or more rules to determine whether an individual message is malicious, similar to the training described in FIG. 2. Instead of relating to group content, individual content may be evaluated. Individual content may refer to content that may be unique to an electronic message (e.g., metadata associated with the electronic message) as opposed to group content, which may refer to content that may be shared across a group of electronic messages (e.g., an IP address). In some instances, the AI engine may utilize supervised learning, in which labeled datasets may be inputted into to the AI engine (e.g., one or more individual electronic messages that were previously determined to be malicious), which may be used to evaluate whether an electronic message is malicious. For example, supervised learning techniques such as linear regression, classification, neural networking, and/or other supervised learning techniques may be used. At step 705, email deluge platform 102 may extract individual content of individual messages of the group of electronic messages. For example, individual content may refer to the length of the content within an electronic message, whether an electronic message contains a link, the domain address of the electronic message, whether the domain address of the electronic message has existed for a certain period of time, metadata associated with the content of the electronic message, and/or other types of individualized content.

At step 710, email deluge platform 102 may evaluate the content of the electronic message. For example, the content of the electronic messages may be analyzed similarly to the group content breakdown and analysis that was discussed with respect steps 230-245 in FIG. 2, whereby individual content is broken down into electronic characteristics, which are used to determine one or more parameters, which are then used to determine whether rules are triggered based on the parameters. At step 715, email deluge platform 102 may output an individual score for an electronic message based on the evaluated performed at step 710. In some instances, the individual score may be a number that corresponds to the number of rules that were triggered based on similar testing to that of the testing that was performed in step 615 of FIG. 6.

At step 720, email deluge platform 102 may determine whether the electronic message is malicious. If the message is determined to be malicious, the method may proceed to step 725. If the message is determined to not be malicious, the method may proceed to step 730. For example, an individual score of 7 may represent 7 rules that were triggered, which, in some instances, may be compared to a threshold, and based on the individual score meeting or exceeding that threshold, show that the electronic message should be quarantined and not allowed to reach its destination (e.g., enterprise user device 104). In some arrangements, if the electronic message is determined to be malicious, then the method of FIG. 6 may be performed with respect to all electronic messages sharing the same electronic user identifier. Additionally or alternatively, if no electronic messages are determined to be malicious, then the method of FIG. 6 may not be performed.

At step 730, email deluge platform 102 may generate an individual remediation report. The individual remediation report may show, for example, a user profile associated with the electronic message, the individual score of a particular message, and any actions taken with respect to the electronic message or group of electronic messages. At step 735, email deluge platform 102 may update the AI engine. The updating may be based on any of steps 705-725. In doing so, email deluge platform 102 may dynamically and continuously update and/or otherwise refine the AI engine so as to increase accuracy of the AI engine over time.

FIGS. 8A-8B show illustrative graphical user interfaces of a group remediation report and an individual remediation report. For example, group remediation report 810 may show a user profile, a group score associated with the group of electronic messages, and an action taken based on the group score. For example, individual remediation report 820 may also show a user profile, the individual score of an electronic message, and actions taken with respect to the electronic message or group of electronic messages. In some cases, either of the group remediation report 810 of FIG. 8A and/or the individual remediation report 820 of FIG. 8B may be sent to an enterprise user device (e.g., enterprise user device 107 or 108).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      train, based on a group of historical electronic messages, an artificial intelligence (AI) engine, wherein training the AI engine includes:
         determining a user profile based on an electronic user identifier associated with the group of historical electronic messages, wherein the determining is based on matching the electronic user identifier with the user profile;

determining one or more historical electronic characteristics based on content associated with the group of historical electronic messages;

determining one or more profile parameters associated with the user profile, wherein the one or more profile parameters correspond to characteristics of a user associated with the user profile;

determining one or more content parameters based on the one or more historical electronic characteristics, wherein each of the one or more content parameters correspond to each characteristic of the one or more historical electronic characteristics; and generating:
one or more profile rules based on the one or more profile parameters; and
one or more content rules based on the one or more content parameters, wherein the one or more profile rules and the one or more content rules are used to determine whether a deluge has been detected;

receive, from one or more electronic source devices, a first group of electronic messages;

input the first group of electronic messages into the trained AI engine;

determine, using the trained AI engine, a first user profile based on a first electronic user identifier associated with the first group of electronic messages;

determine, using the trained AI engine, one or more electronic characteristics based on content associated with the first group of electronic messages;

determine, using the trained AI engine, one or more profile parameters associated with the first user profile;

determine, using the trained AI engine, one or more content parameters based on the one or more electronic characteristics;

execute a first test to output a group score by applying the one or more profile rules and the one or more content rules to the one or more profile parameters associated with the first user profile and the one or more content parameters based on the one or more electronic characteristics;

determine, based on the group score meeting or exceeding a first threshold, that the first deluge has been detected;

quarantine the first group of electronic messages based on the determining;

generate a group remediation report, wherein the group remediation report comprises:
the first user profile;
the group score; and
an indication that the first group of electronic messages was quarantined; and send, to a user device, the group remediation report and one or more commands directing the user device to display the group remediation report, wherein sending the one or more commands directing the user device to display the group remediation report causes the user device to display the group remediation report.

2. The computing platform of claim 1, wherein the first group of electronic messages is quarantined in a quarantine database that securely stores the first group of electronic messages.

3. The computing platform of claim 1, wherein the electronic user identifier is an email address.

4. The computing platform of claim 1, wherein the one or more profile parameters associated with the user profile further comprise a role parameter, a length of role parameter, and a line of business parameter.

5. The computing platform of claim 1, wherein the one or more electronic characteristics further comprise an internet protocol (IP) address, a geographic location, a communications protocol, a security protocol, and a timestamp.

6. The computing platform of claim 1, wherein the memory stores computer-readable instructions that, when executed by the at least one processor, further cause the computing platform to:
lockdown an enterprise system associated with the computing platform and the user device based on the group score meeting or exceeding a second threshold.

7. The computing platform of claim 1, wherein the memory stores computer-readable instructions that, when executed by the at least one processor, further cause the computing platform to:
extract one or more electronic characteristics based on individual electronic message content associated with an electronic message of the first group of electronic messages;
evaluate the one or more electronic characteristics based on the individual electronic message content;
output an individual score based on the evaluating;
determine that the individual electronic message is malicious based on the individual score meeting or exceeding a third threshold;
quarantine the individual electronic message based on the determining;
generate an individual remediation report, wherein the group remediation report comprises:
the first user profile;
the individual score; and
an indication that the individual electronic message was quarantined; and
send, to the user device, the individual remediation report and one or more commands directing the user device to display the individual remediation report, wherein sending the one or more commands directing the user device to display the individual remediation report causes the enterprise user device to display the individual remediation report.

8. The computing platform of claim 1, wherein the one or more electronic source devices have unauthorized access to a private network associated with an enterprise system comprising the computing platform and the user device using a public network.

9. The computing platform of claim 1, wherein the one or more electronic source devices are associated with an enterprise system comprising the computing and the enterprise user device, and are comprised by one or more malicious actors that use the one or more electronic source devices to send the first deluge.

10. The computing platform of claim 1, wherein the memory stores computer-readable instructions that, when executed by the at least one processor, further cause the computing platform to:
update the AI engine based on the first user profile, the executing the first test, the group score, and the quarantining.

11. A method comprising:
at a computing platform comprising at least one processor, a communication interface, and memory:

training, based on a group of historical electronic messages, an artificial intelligence (AI) engine, wherein training the AI engine includes:
  determining a user profile based on an electronic user identifier associated with the group of historical electronic messages, wherein the determining is based on matching the electronic user identifier with the user profile;
  determining one or more historical electronic characteristics based on content associated with the group of historical electronic messages;
  determining one or more profile parameters associated with the user profile, wherein the one or more profile parameters correspond to characteristics of a user associated with the user profile;
  determining one or more content parameters based on the one or more historical electronic characteristics, wherein each of the one or more content parameters correspond to each characteristic of the one or more historical electronic characteristics; and
  generating:
    one or more profile rules based on the one or more profile parameters and
    one or more content rules based on the one or more content parameters, wherein the one or more profile rules and the one or more content rules are used to determine whether a deluge has been detected;
receiving, from one or more electronic source devices, a first group of electronic messages;
inputting the first group of electronic messages into the trained AI engine;
determining, using the trained AI engine, a first user profile based on a first electronic user identifier associated with the first group of electronic messages;
determining, using the trained AI engine, one or more electronic characteristics based on content associated with the first group of electronic messages;
determining, using the trained AI engine, one or more profile parameters associated with the first user profile;
determining, using the trained AI engine, one or more content parameters based on the one or more electronic characteristics;
executing a first test to output a group score by applying the one or more profile rules and the one or more content rules to the one or more profile parameters associated with the first user profile and the one or more profile parameters associated with the first user profile;
determining, based on the group score meeting or exceeding a first threshold, that the first deluge has been detected;
quarantining the first group of electronic messages based on the determining;
generating a group remediation report, wherein the group remediation report comprises:
  the first user profile;
  the group score; and
  an indication that the first group of electronic messages was quarantined; and
sending, to a user device, the group remediation report and one or more commands directing the user device to display the group remediation report, wherein sending the one or more commands directing the user device to display the group remediation report causes the user device to display the group remediation report.

12. The method of claim 11, wherein the first group of electronic messages is quarantined in a quarantine database that securely stores the first group of electronic messages.

13. The method of claim 11, wherein the one or more profile parameters associated with the user profile further comprise a role parameter, a length of role parameter, and a line of business parameter.

14. The method of claim 11, wherein the one or more electronic characteristics further comprise an internet protocol (IP) address, a geographic location, a communications protocol, a security protocol, and a timestamp.

15. The method of claim 11, further comprising:
  locking down an enterprise system associated with the computing platform and the enterprise user device based on the group score meeting or exceeding a second threshold.

16. The method of claim 11, further comprising:
  extracting one or more electronic characteristics based on individual electronic message content associated with an electronic message of the first group of electronic messages;
  evaluating the one or more electronic characteristics based on the individual electronic message content;
  outputting an individual score based on the evaluating;
  determining that the individual electronic message is malicious based on the individual score meeting or exceeding a third threshold;
  quarantining the individual electronic message based on the determining;
  generating an individual remediation report, wherein the group remediation report comprises:
    the first user profile;
    the individual score; and
    an indication that the individual electronic message was quarantined; and
  sending, to the user device, the individual remediation report and one or more commands directing the user device to display the individual remediation report, wherein sending the one or more commands directing the user device to display the individual remediation report causes the user device to display the individual remediation report.

17. The method of claim 11, wherein the one or more electronic source devices have unauthorized access to a private network associated with an enterprise system comprising the computing platform and the enterprise user device using a public network.

18. The method of claim 11, wherein the one or more electronic source devices are associated with an enterprise system comprising the computing and the user device, and have been comprised by one or more malicious actors that use the one or more electronic source devices to send the first deluge.

19. The method of claim 11, further comprising:
  updating the AI engine based on the first user profile, the executing the first test, the group score, and the quarantining.

20. One or more non-transitory computer-readable media storing instructions that, when executed by a computing platform comprising at least one processor, a communication interface, and memory, cause the computing platform to:
  train, based on a group of historical electronic messages, an artificial intelligence (AI) engine, wherein training the AI engine includes:
    determining a user profile based on an electronic user identifier associated with the group of historical electronic messages, wherein the determining is based on matching the electronic user identifier with the user profile;

determining one or more historical electronic characteristics based on content associated with the group of historical electronic messages;

determining one or more profile parameters associated with the user profile, wherein the one or more profile parameters correspond to characteristics of a user associated with the user profile;

determining one or more content parameters based on the one or more historical electronic characteristics, wherein each of the one or more content parameters correspond to each characteristic of the one or more historical electronic characteristics; and generating:
- one or more profile rules based on the one or more profile parameters; and
- one or more content rules based on the one or more content parameters, wherein the one or more profile rules and the one or more content rules are used to determine whether a deluge has been detected;

receive, from one or more electronic source devices, a first group of electronic messages;

input the first group of electronic messages into the trained AI engine;

determine, using the trained AI engine, a first user profile based on a first electronic user identifier associated with the first group of electronic messages;

determine, using the trained AI engine, one or more electronic characteristics based on content associated with the first group of electronic messages;

determine, using the trained AI engine, one or more profile parameters associated with the first user profile;

determine, using the trained AI engine, one or more content parameters based on the one or more electronic characteristics;

execute a first test to output a group score by applying the one or more profile rules and the one or more content rules to the one or more profile parameters associated with the first user profile and the one or more content parameters based on the one or more electronic characteristics;

determine, based on the group score meeting or exceeding a first threshold, that the first deluge has been detected;

quarantine the first group of electronic messages based on the determining;

generate a group remediation report, wherein the group remediation report comprises:
- the first user profile;
- the group score; and
- an indication that the first group of electronic messages was quarantined; and send, to a user device, the group remediation report and one or more commands directing the user device to display the group remediation report, wherein sending the one or more commands directing the user device to display the group remediation report causes the user device to display the group remediation report.

* * * * *